United States Patent
Hoffmann

(10) Patent No.: US 8,006,022 B2
(45) Date of Patent: Aug. 23, 2011

(54) DATA TRANSMISSION DEVICE

(75) Inventor: Michael Hoffmann, Lemgo (DE)

(73) Assignee: Phoenix Contact GmbH & Co. KG (DE)

( * ) Notice: Subject to any disclaimer, the term of this patent is extended or adjusted under 35 U.S.C. 154(b) by 140 days.

(21) Appl. No.: 12/412,660

(22) Filed: Mar. 27, 2009

(65) Prior Publication Data

US 2009/0265492 A1 Oct. 22, 2009

(30) Foreign Application Priority Data

Apr. 16, 2008 (DE) .......................... 10 2008 019 277

(51) Int. Cl.
*G06F 13/36* (2006.01)
(52) U.S. Cl. .......................... 710/306; 710/310; 710/311
(58) Field of Classification Search .................... 710/33, 710/106, 305–306, 310–311, 100, 314, 315
See application file for complete search history.

(56) References Cited

U.S. PATENT DOCUMENTS

| 5,522,050 | A  | * | 5/1996 | Amini et al. ................... 710/315 |
| 7,370,112 | B2 |   | 5/2008 | Saito et al. |
| 2004/0158634 | A1 | * | 8/2004 | Saito et al. .................... 709/225 |
| 2005/0254518 | A1 | * | 11/2005 | Fujimori ........................ 370/466 |
| 2006/0026327 | A1 | * | 2/2006 | Arndt et al. .................... 710/306 |
| 2006/0045135 | A1 | * | 3/2006 | Hetzel et al. ................... 370/503 |
| 2006/0212661 | A1 | * | 9/2006 | Inagaki et al. ................. 711/147 |
| 2006/0218334 | A1 | * | 9/2006 | Spry et al. ..................... 710/309 |

FOREIGN PATENT DOCUMENTS

| DE | 10 2005 021 820 A1 | 2/2006 |
| EP | 1 079 569 A1 | 8/1999 |
| EP | 0998081 A1 | 5/2000 |
| WO | 2004077771 A1 | 9/2004 |
| WO | 2007/134955 A1 | 11/2007 |

OTHER PUBLICATIONS

"The Free On-Line Dictionary of Computing". Entry 'hard-wired'. Online Oct. 18, 1998. Retrieved from Internet Oct. 6, 2010. <http://foldoc.org/hard-wired>.*
Athanasios Mariggis, "EP Patent Application: EP 09 00 4526 Search Report", Jul. 7, 2009, Publisher: EPO, Published in: EP.
German Office Action dated Nov. 6, 2008, Application 10 2008 019 277.5, German Patent Office.

* cited by examiner

*Primary Examiner* — Thomas J Cleary
(74) *Attorney, Agent, or Firm* — DeMont & Breyer LLC

(57) ABSTRACT

The invention relates to a data transmission device for transmitting data between a first bus system and a second bus system with a copy table (103) for providing an output sequence of data of the first bus system and a transmission device (101) for transmitting data between the first bus system and the second bus system according to the output sequence.

8 Claims, 6 Drawing Sheets

Fig. 3

| | |
|---|---|
| IOPS TN1 | 0x00 |
| IOCS TN1 | 0x01 |
| IOPS TN2 | 0x02 |
| IOCS TN2 | 0x03 |
| IOPS TN3 | 0x04 |
| IOCS TN3 | 0x05 |
|  | 0x06 |
|  | 0x07 |
| PD Byte 1 TN1 | 0x08 |
| PD Byte 2 TN1 | 0x09 |
| PD Byte 2 TN2 | 0x0A |
| PD Byte 1 TN2 | 0x0B |
| PD Byte 1 TN3 | 0x0C |
| PD Byte 3 TN3 | 0x0D |
| PD Byte 4 TN3 | 0x0E |
| PD Byte 2 TN3 | 0x0F |
| PD Byte 5 TN3 | 0x10 |

Fig. 4

| | | |
|---|---|---|
| IOPS | MM TN1 | 0 |
| IOCS | MM TN1 | 1 |
| PD Byte 1 TN1 | | 2 |
| PD Byte 2 TN1 | | 3 |
| IOPS | MM TN2 | 4 |
| IOCS | MM TN2 | 5 |
| PD Byte 2 TN2 | | 6 |
| PD Byte 1 TN2 | | 7 |
| IOPS | MM TN3 | 8 |
| IOCS | MM TN3 | 9 |
| PD Byte 1 TN3 | | 10 |
| PD Byte 3 TN3 | | 11 |
| PD Byte 4 TN3 | | 12 |
| PD Byte 2 TN3 | | 13 |
| PD Byte 5 TN3 | | 14 |

DATA TRANSMISSION DEVICE

FIELD OF THE INVENTION

The present invention relates to the field of data transmission between bus systems.

BACKGROUND OF THE INVENTION

In modern communications and control systems, control systems can be used for data transmission or for the control of various field-bus systems that often must be coupled to each other, wherein a difference can be defined between a higher-level bus system and a lower-level bus-system. The higher-level bus system is a bus system that is connected to a control system. In contrast, the lower-level bus system is a bus system that must be coupled to a higher-level bus system. In this context, the problem arises of receiving or transmitting data from one bus system to the other bus system without time losses as much as possible. In addition, the data also often must be output in a different sequence and control data often must be added to the data. Typically, memories, so-called buffers, are used for these purposes that are rearranged by a CPU (CPU: Central Processing Unit). This method, however, is time intensive and leads to a large load on the processor.

SUMMARY OF THE INVENTION

The problem of the present invention is to create an efficient design for data transmission between bus systems.

This problem is solved by the features of the independent claims.

The invention is based on the knowledge that, for a coupling of known buses, the output sequence of data is already known in advance, so that for bypassing a CPU, for example, a copy table and a transmission device that is, for example, a hard-wired or fixed-program device can be used for coupling. For this purpose, the data is suitably rearranged and fed to the second, lower-level bus in the sequence required on the side of this bus.

The transmission device is, for example, a transmission device that is adapted to the requirements of the bus coupling and that can process time-optimized data from various memory locations in parallel. The transmission device thus always has the same configuration for the same bus systems and is therefore faster than a universal CPU.

The copy table is created such that different information can be retrieved, for example, with only one memory access. The information includes, for example, the offset address of a memory of one of the buses, for example, an offset address of a PD memory (PD: process data) of a Profinet, which can be, for example, one of the bus systems. Furthermore, the information can relate to the data type and can specify, in particular, how large the optional PD data is. Furthermore, the information can specify the byte position, for example, in a lower-level field-bus object. The data mentioned above can also be further processed by the transmission device, for example, in parallel.

Thus, according to the invention, process data can be sorted suitably at runtime without the use of a CPU, so that the coupling of the bus systems can be performed in an accelerated manner. In this way, in particular, the features and characteristics of the bus systems can be taken into account.

The lower-level bus system can have, for example, a configuration that can change and require intervention by the CPU only when there are interruptions in the data flow. Under this assumption, a data memory can be recoded according to certain rules into a different data memory in which the transmission device can process the copy table, for example, in the form of a correspondingly coded table that can be stored in a RAM memory (RAM: Random Access Memory). The copy table includes, for example, the source address of the corresponding data stored in the memory. Through additional expansions of the copy table, additional characteristics of the bus systems can be taken into account that relate to, for example, the display of a device capture or a data set. If necessary, the transmission device can combine data from different memory locations.

The invention relates to a data transmission device for transmitting data between a first bus system and a second bus system with a copy table for providing an output sequence of data of the first bus system and a transmission device for transmitting the data between the first bus system and the second bus system according to the output sequence.

According to one embodiment, the data of the first bus system can be stored in one memory, wherein the transmission device is formed to read the data from the memory according to the output sequence and to supply this data to the second bus system.

According to one embodiment, the transmission device includes a control unit, in particular, a hard-wired or a non-programmable or a fixed-program control unit for accesses to the copy table.

According to one embodiment, the transmission device includes a memory, a control unit, and a multiplexer, wherein the memory is provided for storing the data of the first bus system, wherein an output of the memory is connected to the multiplexer and wherein an output signal of the multiplexer can be coupled to the second bus system.

According to one embodiment, the copy table is further used for providing an offset address or a data type or a byte position.

According to one embodiment, the transmission device further includes a second memory for storing additional data, for example, management data or status information, wherein the transmission device is formed to link the data with the additional data, in order to obtain linked data, and to supply the linked data to the second bus system.

The invention further relates to a communications system with a memory that is assigned to a first bus system and with the data transmission device according to the invention for transmitting data between the first memory of the first bus system and the second bus system.

The invention further relates to a data transmission method for transmitting data between a first bus system and a second bus system: preparation of an output sequence of data of the first bus system and transmission of data between the first bus system and the second bus system according to the output sequence.

The invention further relates to a communications method with the storage of data assigned to a first bus system and transmission of the stored data between the first bus system and the second bus system according to the method for transmitting data.

The invention further relates to a program-specific device with a computer program for executing one of the methods according to the invention.

The invention further relates to a computer program for executing one of the methods when the computer program runs on a computer.

BRIEF DESCRIPTION OF THE DRAWINGS

Other embodiments of the invention will be explained in greater detail with reference to the accompanying drawings. Shown are.

DETAILED DESCRIPTION

Figure 1:
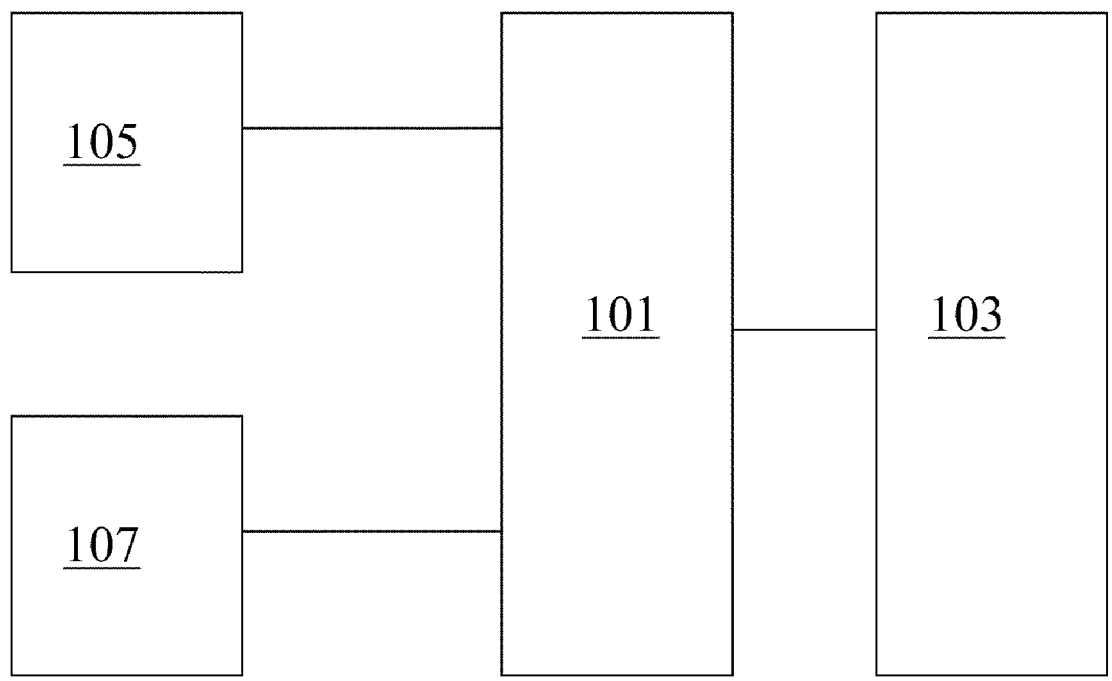
FIG. 1, a data transmission device,
FIG. 2, a communications scenario,
FIG. 3, process data in a Profinet memory,
FIG. 4, a data sequence in a lower-level bus,
FIG. 5, a communications system, and
FIG. 6, a communications system.

The data transmission device shown in FIG. 1 includes a transmission device 101 and a copy table 103 coupled to the transmission device 101. The transmission device 101 is provided to transmit data between a first bus system 105, for example, a Profinet bus system, and a second bus system 107 according to the sorting rule or output sequence stored in the copy table. The transmission device 101 can further include, for example, a control unit that regulates access to the copy table 103 and also to the memory of the bus systems 105 and 107.

Figure 2:
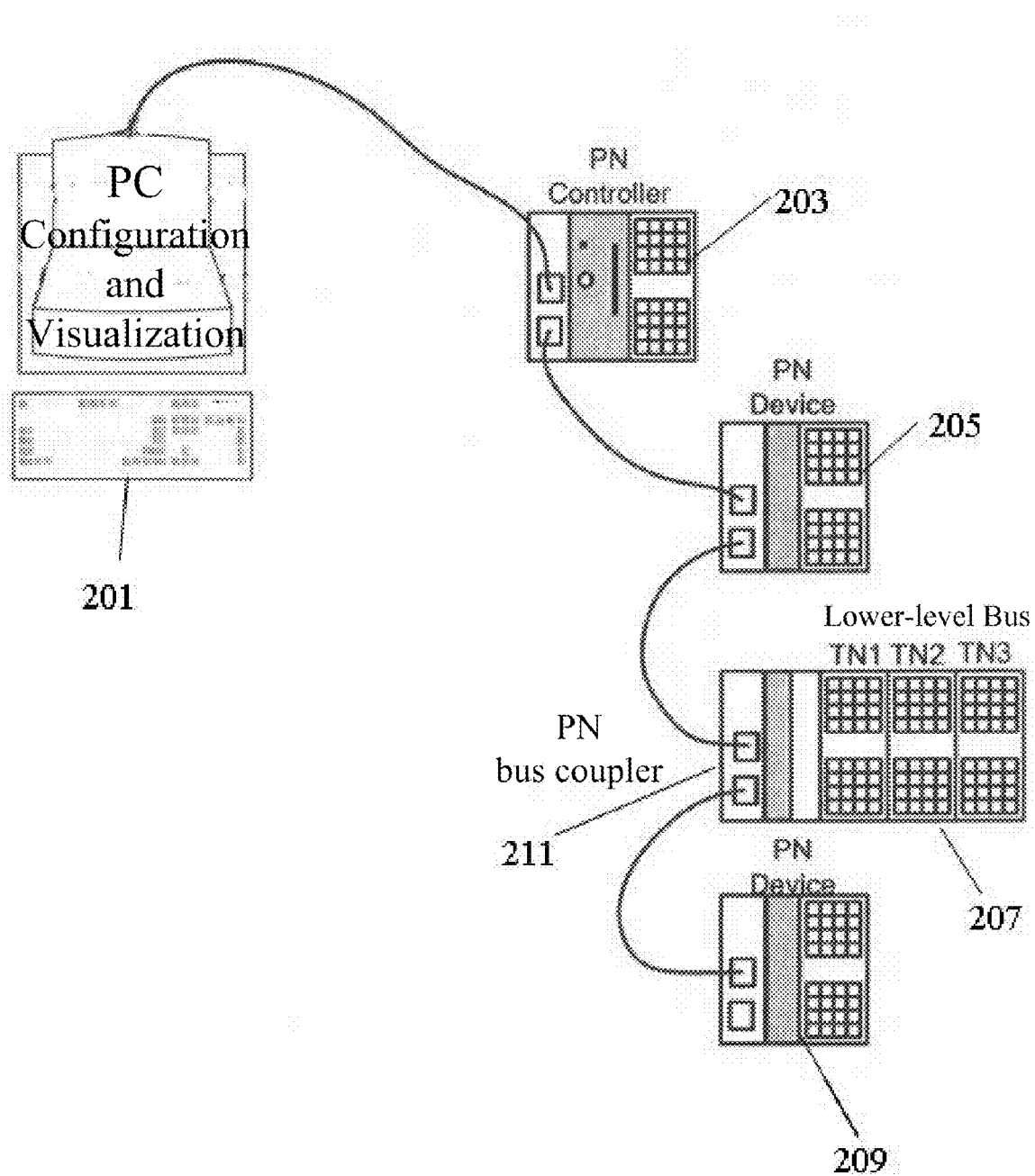

FIG. 2 shows a communications scenario with a PC 201 that executes, for example, the configuration and the visualization of the processes. Furthermore, a PN controller 203 (PN: Profinet), a Profinet device 205, a lower-level bus 207 with subscribers TN1, TN2, TN3, and also another Profinet device 209 are provided. The lower-level bus further includes a Profinet bus coupler 211. The Profinet device 211 has the task of coupling the lower-level bus system 207 to the Profinet system. In this way, the Profinet system delivers data that relates to a user status (IOCS: Input/Output Consumer Status) or a provider status (IOPS: Input/Output Provider Status) for each slot, e.g., for each field-bus device. The Profinet device 211 can output, for example, the status data and the process data in a buffer. In this way, the Profinet controller 203 distributes the data, so that this data can be and, if necessary, also must be rearranged for the lower-level bus.

The lower-level bus 207 further requires, for example, management data for each subscriber, wherein the Profinet status can be transmitted with the management data. FIG. 3 shows, as an example, the arrangement of process data in a Profinet memory by means of which a process data image is fixed. In this way, the memory locations can each be addressed by addresses, for example, 0x00, 0x01 to 0x10, and are provided for storing the data shown in FIG. 3 as an example.

FIG. 4 shows a lower-level bus that requires, for example, a data sequence with the data arrangement shown in FIG. 3. Also specified in FIG. 4 is the output sequence of the data. Initially, the data 0 to 3 is output, which is associated with the data 0x00, 0x01 and also 0x08 and 0x09 from FIG. 3. Then the data 4 to 7, which is associated with the locations 0x02, 0x03, 0x0A and 0x0B from FIG. 3 is fed to the second bus system. Finally, the data 8 to 14, which is associated with the locations 0x04, 0x05, 0x0C to 0x10 is output. Here, TN designates the subscriber of the lower-level bus and MM designates the management of the lower-level bus.

For each subscriber of the lower-level bus system, for example, a management buffer (MM) is initialized with management bytes, wherein the copy table is initialized with offset addresses, as well as, for example, with extended bits that are optional and that can include additional information. The transmission device or its control unit generates, for example, the address for respective control data that is increased linearly beginning with 0x0 up to the end of the initialized range. Here, one data unit is needed as an address for the process data memory of the Profinet. The extended bits, for example, Byte 1, Byte 2, and the data type with the output sequence 8 to 14 and also in the associated locations from FIG. 3 are required by the control unit, in order to generate a data access to the management buffer and to the process data buffer in the Profinet (PD Buffer Profinet). If one of the bits of Byte 1, 2 is active, then the management data can be linked with IOPS or with IOCS data of the Profinet buffer and can be output, for example, by means of a multiplexer. If the bits are not active, then the data can be output from a Profinet data buffer, for example, directly by means of a multiplexer. The bit Datatype is used in order to distinguish whether one or two bytes should be sent. Here, other functions can be carried out by means of a corresponding coding of the extended bits.

Figure 5:
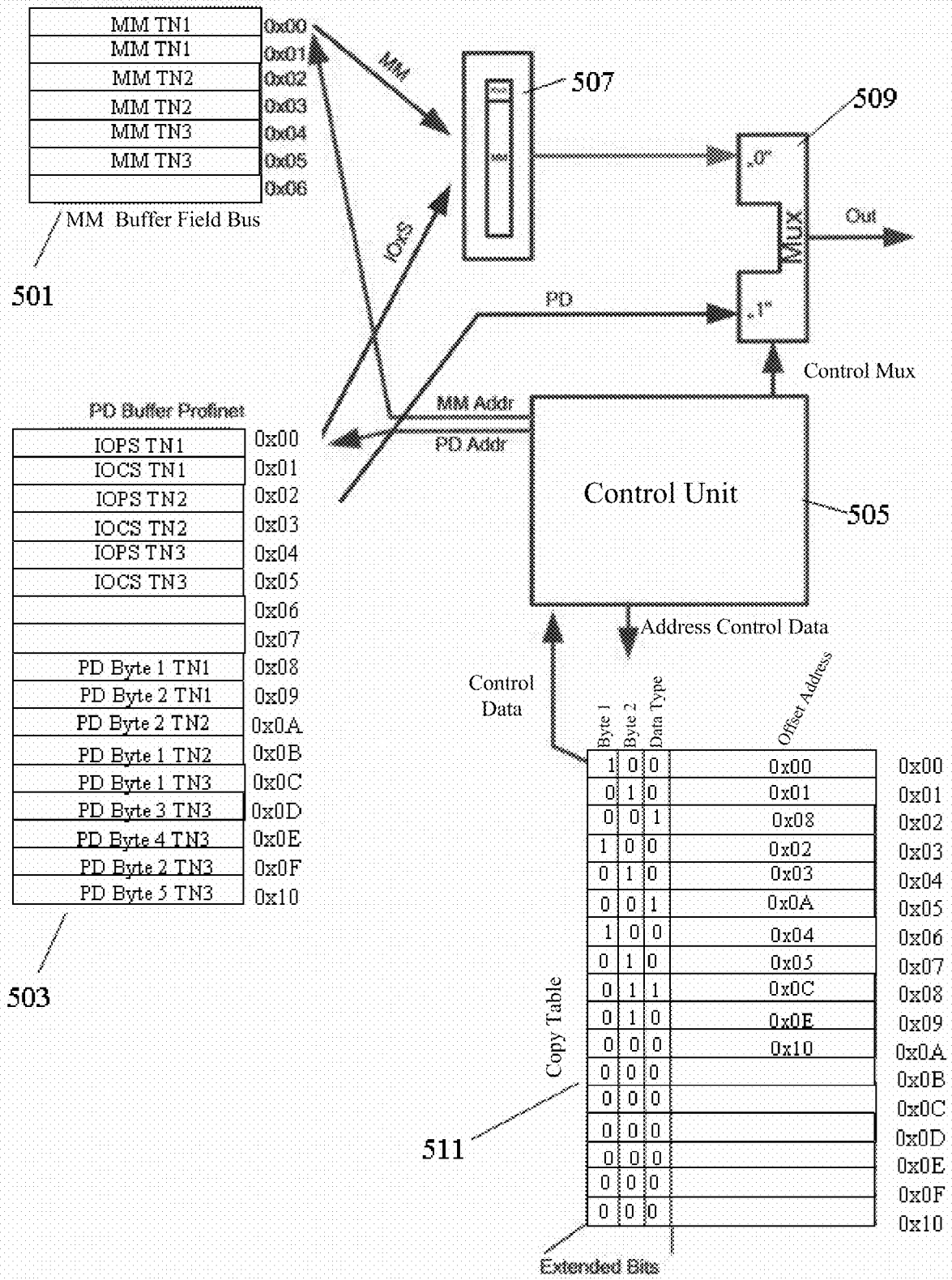

FIG. 5 shows a communications scenario with a management buffer 501 and a PD buffer Profinet 503. For bus coupling there is a transmission device including a control unit 505, a memory 507, a multiplexer 509, and also a copy table 511. Here, for example, the locations 0x00 and 0x01 of the management buffer 501 are associated with the locations 0x00, 0x01 and also 0x08 and 0x09 of the Profinet bus 503. In contrast, the locations 0x02 and 0x03 are associated with the locations 0x02, 0x03, 0x0A and 0x0B of the Profinet bus 503. The locations 0x04 and 0x05 of the field bus 501 are associated with the locations 0x04, 0x05, 0x0C, 0x0D, 0x0E, 0x0F and 0x10.

The control unit 505 defines the process data addresses and the management addresses, wherein the correspondingly addressed locations are stored in the memory 507. One output of the memory 507 and also the Profinet bus 503 are connected to inputs of the multiplexer 509 that provides an output signal Out. The control unit 505 is provided for controlling the multiplexer, for example, as a function of control data provided by the copy table 511 and to activate one of its outputs. The multiplexer 509 is thus used as a controlled switch.

Access to the copy table 511 begins, for example, at address 0 that is then increased, for example, by 1. The copy table contains, for example, two different data fields and is provided, for example, for providing the offset address for the process data buffer Profinet 503, the data type, and the byte position. After, for example, one cycle, all of the data is present, so that the control unit 505 generates the process data address from the offset address. Simultaneously, the control unit 505 generates the management address that sets a management byte for the lower-level field-bus system 503 from the byte positions Byte 1 and Byte 2. The control data Steuer-Mux that controls the multiplexer 509 is generated in parallel from Byte 1 and Byte 2. In this way, after one cycle, the two RAM buffers PD buffer Profinet 503 and MM buffer field-bus 501 deliver data that can be linked by means of a logic unit of the memory 507. The status from the PD buffer IOPS or IOCS is here masked, for example, into the management byte, wherein the data can be output by means of the multiplexer 509. This method is executed again with an address increased by 1.

The buffer 507 (MM: Management data) initially contains management data for the lower-level bus system. The data IOxS is transmitted in the Profinet system as the IO Status and should be transmitted in the lower-level system in the management word. Furthermore, it is distinguished between IOCS and IOPS, wherein with IOxS both IOCS and also IOPS are meant.

In the multiplexer 509, the data flow for the lower-level bus system is assembled, for example, as shown in FIG. 4. As the first data, the MM of TN1 should be output with the IOPS TN1. For this purpose, the data is retrieved from the two buffers and linked in block 507 (MM). The MUX 509 is connected so that the data is output as OUT. Then the data MM TN1 (address 1) is linked with the IOCS TN1 and output via OUT. As the next byte, the byte PD Byte 1 TN1 (address 8) is retrieved from the PD Buffer and output by means of the MUX via OUT. The sequence is set in the copy table 511 that is processed upward starting from address 0. The output data of the multiplexer can be fed directly to the lower-level bus, wherein buffering of the data can be eliminated.

In the multiplexer (MUX) 509, the data flow for the lower-level bus system is assembled, in order to assume, for example, the form shown in FIG. 3.

As the first data, the MM of TN1 can be output with the IOPS TN1. For this purpose, the data is retrieved from the two buffers and linked in the block MM. The MUX 509 is connected so that the data is output via the OUT output. Then the data MM TN1 (address 1) is linked with the IOCS TN1 and output via the OUT output.

As the next byte, the byte PD Byte 1 TN1 (address 8) can be retrieved from the PD Buffer and output by means of the MUX 509 via the OUT output. The sequence is set in the copy table that is processed, for example, upward starting from address 0.

The embodiment shown in FIG. 5 takes advantage of the fact that field-bus systems, as a rule, require management information in order to be able to operate the field bus. Here, available information is, for example, information concerning the subscriber number, the last subscriber in the bus, the shutdown status of forwarding interfaces, the activity status of the subscriber, the validity or the invalidity of the data, such as, IOPS or IOCS, etc. This information can be added to the data of the higher-level system and also to the data of the lower-level system. For example, the data can be transmitted in the MM 501.

The data transmission device thus allows a coupling of different field-bus systems, wherein data of one system can be sorted suitably into the other system. The data transmission device can be implemented, for example, in hardware, so that for matching two bus systems, process data can be received from one system into the other system efficiently and quickly when corresponding buffers are pre-initialized. Furthermore, data from the process data memory can be combined with management data, wherein the combination can be performed freely and wherein the characteristics of the bus systems can be taken into account. Furthermore, the extended bits can be expanded, so that other functions can also be installed for coupling the two systems. Preferably, the copy process takes place without a processor after an initialization.

The copy unit according to the invention from FIG. 5 assembles the data from FIG. 3 with data from the additional buffer 507 in which management data can be stored for the lower-level bus system in a data sequence on the output OUT to form data mapped in the data image according to FIG. 4. In this way, the data can be output on the output OUT directly via the lower-level bus system.

Figure 6:
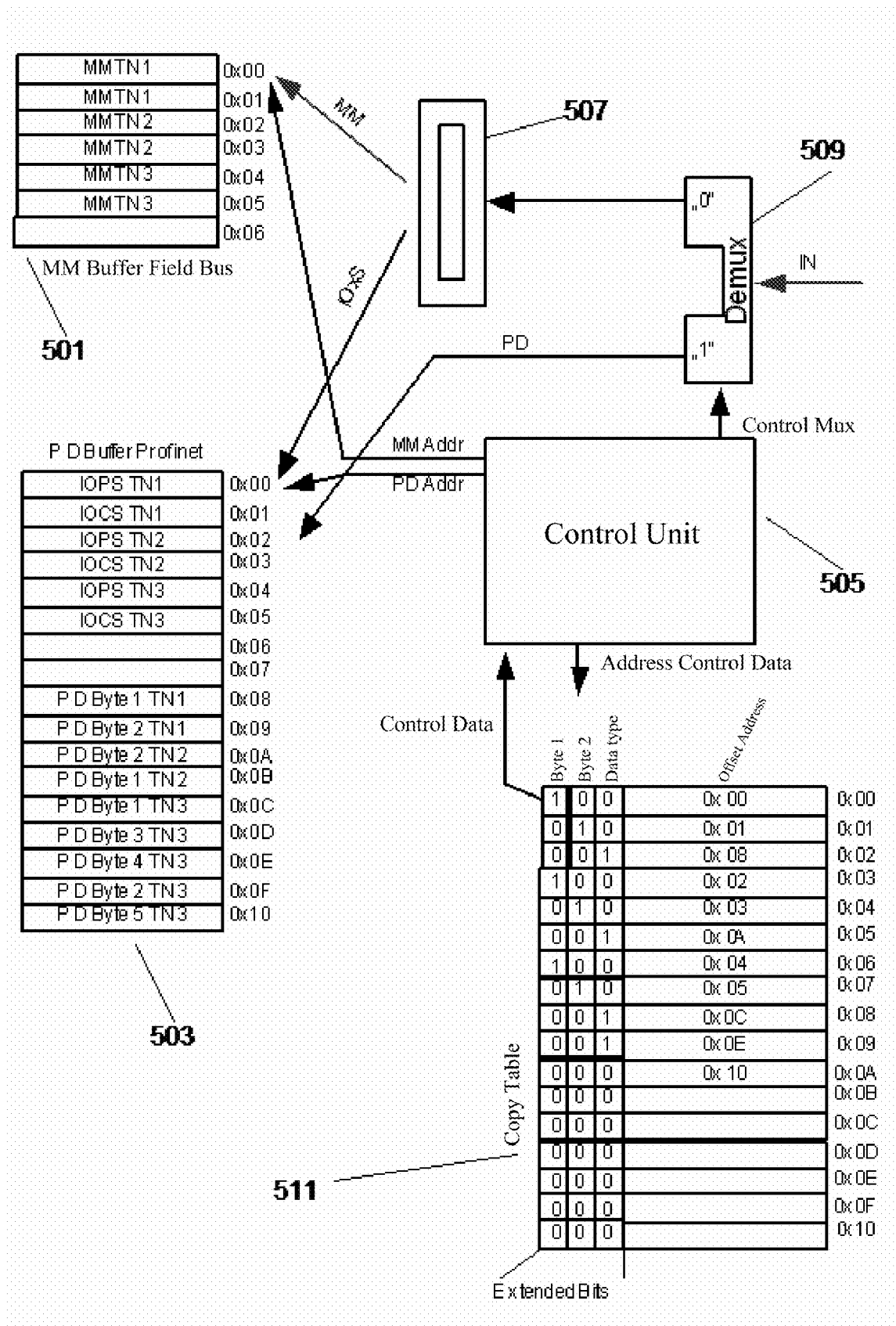

FIG. 6 shows the copy unit from FIG. 5 that is operated in the opposite direction in terms of data flow. Here, the data originates from the lower-level bus system and is copied in the PD Buffer 503 for the higher-level bus system.

The coupling concept according to the invention can be used for different field-bus bus systems, e.g., for Profinet as a higher-level system and Interbus as a lower-level system. Coupling consists in that, for example, data transmitted, for example, in the Profinet system can be output or read on a lower-level system. The copy unit according to the invention completes this task, wherein the data of the higher-level system from FIG. 3 can be assembled from data for the lower-level system, as shown in FIG. 4.

What is claimed is:

1. A data transmission device for transmitting data between a first bus system and a second bus system comprising:
    a copy table (103) for providing an output sequence of data of the first bus system, the output sequence determining a sorting rule for the data of the first bus system; and
    a transmission device (101) for transmitting data between the first bus system and the second bus system according to the output sequence;
    wherein at least one of the first bus system and the second bus system is a field-bus system;
    wherein the transmission device includes a memory for storing data of the first bus system, a control unit for accessing the copy table, and a multiplexer;
    wherein an output of the memory is connected to the multiplexer; and
    wherein the multiplexer is controlled by the control unit upon the basis of the output sequence provided by the copy table in order to feed output data of the multiplexer to the second bus system.

2. The data transmission device according to claim 1, wherein the copy table (103) is further provided for providing at least one of:
    (i) an offset address, a data type, and a byte position;
    (ii) the offset address and the data type;
    (iii) the offset address and the byte position;
    (iv) the data type and the byte position;
    (v) the offset address;
    (vi) the data type; and
    (vii) the byte position.

3. The data transmission device according to claim 1 that has a further memory, wherein the further memory is for storing additional data, and wherein the transmission device (101) is constructed to link the data with the additional data and to supply the linked data to the second bus system.

4. The data transmission device according to claim 1, wherein the control unit is a hard-wired or a fixed-program control unit.

5. Communications system comprising:
    a memory that is assigned to a first bus system; and
    the data transmission device according to claim 1 for transmitting data between the memory of the first bus system and the second bus system.

6. A data transmission method for transmitting data between a first bus system and a second bus system comprising:
    preparing an output sequence of data of the first bus system, the output sequence determining a sorting rule for the data of the first bus system; and
    transmitting data between the first bus system and the second bus system according to the output sequence;
    wherein at least one of the first bus system and the second bus system is a field-bus system; and
    wherein transmitting includes:
    storing data of the first bus system; and
    multiplexing the stored data of the first bus system upon the basis of the output sequence in order to feed the multiplexed data to the second bus system.

7. A device configured to run a computer program for executing the method of claim 6.

8. A computer-readable storage medium for storing a computer program for executing the method of claim 6 when the computer program runs on a computer.

* * * * *